US007548512B2

(12) United States Patent
Sexton et al.

(10) Patent No.: US 7,548,512 B2
(45) Date of Patent: Jun. 16, 2009

(54) METHODS AND SYSTEMS FOR PRIORITIZING DATA TRANSFERRED ON A LOCAL AREA NETWORK

(75) Inventors: Daniel White Sexton, Niskayuna, NY (US); John Erik Hershey, Ballston Lake, NY (US); Michael James Hartman, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1004 days.

(21) Appl. No.: 10/358,829

(22) Filed: Feb. 6, 2003

(65) Prior Publication Data

US 2004/0156360 A1   Aug. 12, 2004

(51) Int. Cl.
*H04L 12/26* (2006.01)
(52) U.S. Cl. .................... 370/235; 370/395.42; 709/240
(58) Field of Classification Search ................. 370/229, 370/230, 235, 389, 391, 392, 395.4, 395.42, 370/412; 709/225, 232, 240, 250
See application file for complete search history.

(56) References Cited

U.S. PATENT DOCUMENTS

| 4,819,229 | A | * | 4/1989 | Pritty et al. | 370/455 |
|---|---|---|---|---|---|
| 5,444,705 | A | * | 8/1995 | Olnowich et al. | 370/388 |
| 5,546,453 | A | | 8/1996 | Herbert | 379/242 |
| 5,561,669 | A | * | 10/1996 | Lenney et al. | 370/352 |
| 6,034,963 | A | | 3/2000 | Minami et al. | 370/401 |
| 6,188,698 | B1 | * | 2/2001 | Galand et al. | 370/412 |
| 6,363,429 | B1 | * | 3/2002 | Ketcham | 709/235 |
| 6,633,564 | B1 | * | 10/2003 | Steer et al. | 370/389 |
| 6,704,409 | B1 | * | 3/2004 | Dilip et al. | 379/265.02 |
| 7,096,261 | B2 | * | 8/2006 | Abrol et al. | 709/223 |
| 7,218,610 | B2 | * | 5/2007 | Sivakumar et al. | 370/230 |
| 2002/0061018 | A1 | | 5/2002 | Chien | 370/389 |
| 2002/0080808 | A1 | * | 6/2002 | Leung | 370/412 |
| 2002/0146031 | A1 | * | 10/2002 | Nichols | 370/445 |
| 2002/0181453 | A1 | * | 12/2002 | Norman et al. | 370/386 |
| 2003/0095560 | A1 | * | 5/2003 | Arita et al. | 370/431 |
| 2003/0101274 | A1 | * | 5/2003 | Yi et al. | 709/232 |
| 2004/0139201 | A1 | * | 7/2004 | Chaudhary et al. | 709/229 |

* cited by examiner

*Primary Examiner*—Chi H. Pham
*Assistant Examiner*—Shick Hom
(74) *Attorney, Agent, or Firm*—Joseph J. Christian

(57) ABSTRACT

A method of prioritizing messages on a Local Area Network comprises receiving a digitized incoming message, comparing a message signature of the incoming message with a stored priority message signature, passing non-priority messages to a standard Ethernet protocol stack for processing, storing priority messages temporarily, preventing priority messages from being processed in the standard Ethernet protocol stack, and handling priority messages using a simplified protocol stack designed to process a specific data packet type. This method may be performed by an Application Specific Integrated Circuit (ASIC) inserted between an Ethernet PHY layer and Ethernet MAC layer on a Network Interface Card of a host device. In particular, automated machinery control systems using the Ethernet protocol for networking are intended to benefit from the prioritizing method and implementation.

35 Claims, 10 Drawing Sheets

PRIOR ART

PRIOR ART

METHODS AND SYSTEMS FOR PRIORITIZING DATA TRANSFERRED ON A LOCAL AREA NETWORK

BACKGROUND OF THE INVENTION

The invention relates to computer networking. More specifically, the invention relates to Local Area Networks (LANs). Even more specifically, the invention relates to methods and systems for optimizing data transfer on a Local Area Network by prioritizing specific data types Networking allows one device (e.g., a computer) to send information to and receive information from another device (e.g., a computer). In 1973, at Xerox Corporation's Palo Alto Research Center (more commonly known as PARC), researcher Bob Metcalfe designed and tested the first Ethernet network, a standard networking protocol that is used widely today. Metcalfe developed the physical method of cabling that connected devices on the Ethernet as well as the standards that governed communication on the cable.

Computers and computing devices currently need to communicate with each other almost constantly. Thus, the high-speed communication provided by networking represents an important aspect of many businesses. The current industry need for fast, efficient, low-cost networking, drives a continual effort to improve networking architecture, protocol, and performance.

One type of network is a local area network (LAN). LAN's may provide a communication interface in many environments, e.g., a factory containing many automated machines communicating with each other. Through a LAN (hardware, network protocol, etc.), the machines communicate to each other or to a control center, thereby allowing a complex, coordinated communication capability. The networked automated machines and processes, however, are often limited by the speed of the LAN to which they are connected.

The network speed can be affected by the number of computing devices that share the network, the size and number of messages being sent over the network, processing speed, etc. The algorithm that controls the transfer of data is called a protocol, e.g., Ethernet. If many messages are being processed on the network at the same time, a bottleneck is often created because each computing device (often called a node) receiving the messages must take time to analyze parts of each message.

There are many types of data transmitted over local area networks, each with a different signature. Some data has a higher priority than others, especially in time sensitive applications (e.g., automated machinery) that rely on specific data being transferred over a LAN in order to perform a function. Many existing network protocols, however, provide only primitive priority message handling, i.e., priority data often waits to be processed. Additionally, some data transmitted over a LAN are not even relevant to every device on the network, but still require processing time.

In the past, efforts to increase the speed of extant LANs have mainly focused on either increasing the processing capacity and/or increasing the communication bandwidth of the networks. In particular, increasing network bandwidth has recently been advancing more rapidly than processing power, and is a common "upgrade" to existing networks. While adding more processing power and bandwidth to a network can be effective, it is an expensive solution to a problem that can be resolved by efficient network data management.

BRIEF SUMMARY OF THE INVENTION

The invention provides a method and system for transferring data within a network. The method and system of the invention handle different priority data on extant Local Area Networks (LANS) by modifying the standard Ethernet protocol path used to process data. Data on the network is received at nodes and/or switches having a modified Ethernet protocol path, wherein real-time control Ethernet components are placed between the Ethernet PHY and MAC layers. The real-time control Ethernet components compare the incoming data with data signatures stored locally and provide new modes of handling a variety of priority and non-priority data.

BRIEF DESCRIPTION OF THE DRAWINGS

The accompanying drawings illustrate various embodiments of the invention and are a part of the specification. Together with the following description, the drawings demonstrate and explain the principles of the invention. The illustrated embodiments are examples of the invention and do not limit the scope of the invention.

Throughout the drawings, identical reference numbers designate similar, but not necessarily identical, elements.

DETAILED DESCRIPTION OF THE INVENTION

The description provides specific details in order to provide a thorough understanding of the invention. The skilled artisan, however, would understand that the invention can be practiced without employing these specific details. Indeed, the present invention can be practiced by modifying the illustrated system and method and can be used in conjunction with apparatus and techniques conventionally used in the industry. For example, while the invention is described primarily for handling MII (Media Independent Interface) protocol data transfers, it could be adapted to any kind of data transfer protocols, including GMII, and Raw Frames. In describing the invention, the term "message" will be used to describe any data transfer.

As noted above, the invention provides a method for handling priority data on a network. In one aspect of the invention, the invention provides a method for handling messages on a Local Area Network. Messages on the network are received by nodes and/or switches having a modified Ethernet protocol path, wherein real-time control Ethernet components are placed between the Ethernet PHY and MAC layers. The real-time control Ethernet components compare the incoming messages with message signatures stored locally and provide new modes of handling a variety of priority and non-priority messages.

More specifically, two types of "priority switches" are implemented to handle priority messages. One type is a "processing" priority switch, implemented at one or more nodes of a network for faster processing of priority messages. The other type is a "forwarding" priority switch, implemented at one or more switches in the infrastructure of a network to provide forwarding control of priority and non-priority messages.

Figure 1:
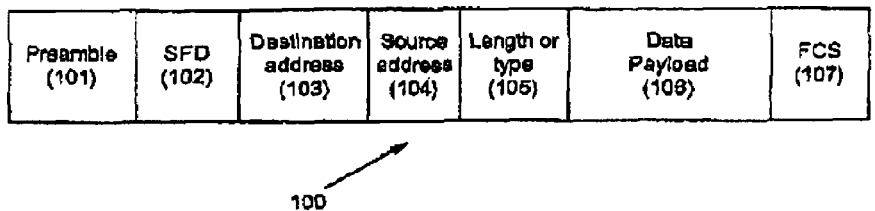
FIG. 1 is a block diagram illustrating an Ethernet Protocol Frame used in one aspect of the invention.

The invention can be used with any network protocol known in the art, including Token Ring, ARCNET, and the Ethernet protocol described below. The protocol enables computing devices connected on a network to send and receive data packets. As illustrated in FIG. 1, an Ethernet protocol frame (100), i.e., the structure used to transfer data on a network, consists of several defined segments. More specifically, an Ethernet protocol frame (100) is composed of a preamble (101), start frame delimiter or SFD (102), destination address (103), source address (104), length/type field (105), data payload field (106), and a FCS or Frame Check Sequence (107).

The preamble (101) is a sequence of alternating 1 and 0 bit values, which serves to give components in the network time to detect the presence of a signal before the data frame arrives. The SFD (102) is a sequence of bits (10101011) that designates the start of a frame. The destination address (103) identifies a single recipient, a group of recipients, or the set of all recipients on a network and in one aspect of the invention is specified with 6 bytes of data. Another 6 bytes of data identify the unique source address (104) of the sender. The length/type field (105) identifies the number of bytes in the data payload (106) or the protocol type, i.e., a number of publicly and privately owned Ethernet protocol types. Some examples of high-level protocol types that may be identified in the length/type field (105) include TCP, Xerox Network System, AppleTalk, etc.

The data payload field (106) contains the bulk of the data of the Ethernet protocol frame (100). In one aspect of the invention, the data packet field contains 46 to 1500 bytes of data that is normally processed by the higher-level layers of a network protocol stack. To ensure that the same data transferred is received, a Frame Check Sequence (107) is used which, in one aspect of the invention, contains 4 bytes of data. The value of the FCS (107) is calculated from the data payload (106) using a cyclic-redundancy check (e.g., CRC) algorithm containing, for example, 32 bytes of data (CRC-32). As the data packets of the data payload (106) are received, the receiving station performs the same calculations as the CRC algorithm and compares the result to the FCS (107) transmitted with the Ethernet protocol frame (100). If the results are different, the data payload (106) is rejected.

Figure 2:
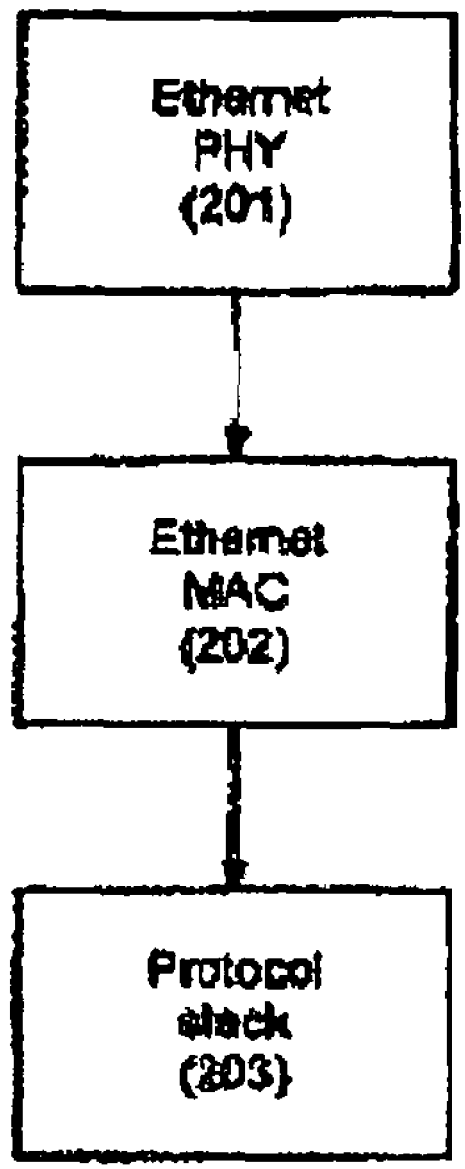
FIG. 2 is a flowchart illustrating a standard Ethernet protocol for handling messages on a network.

FIG. 2 is a flowchart illustrating one method for handling an incoming Ethernet frame, e.g., the frame described in FIG. 1. As shown in FIG. 2, the frame arrives to the Ethernet PHY layer (201) of the Ethernet protocol stack. The Ethernet PHY consists of hardware that converts the analog signals on the communication media to a digital format, extracting both the clocking or timing information and the data. The frame containing the data is then sent directly to the Ethernet MAC layer (202) using a standard interface called the MII or Media Independent Interface. The MAC (202) may accept or reject the incoming frame based on the Frame Check Sequence described above. If the incoming frame is accepted, it is passed to the subsequent protocol stack layers (203) for further processing.

Figure 3:
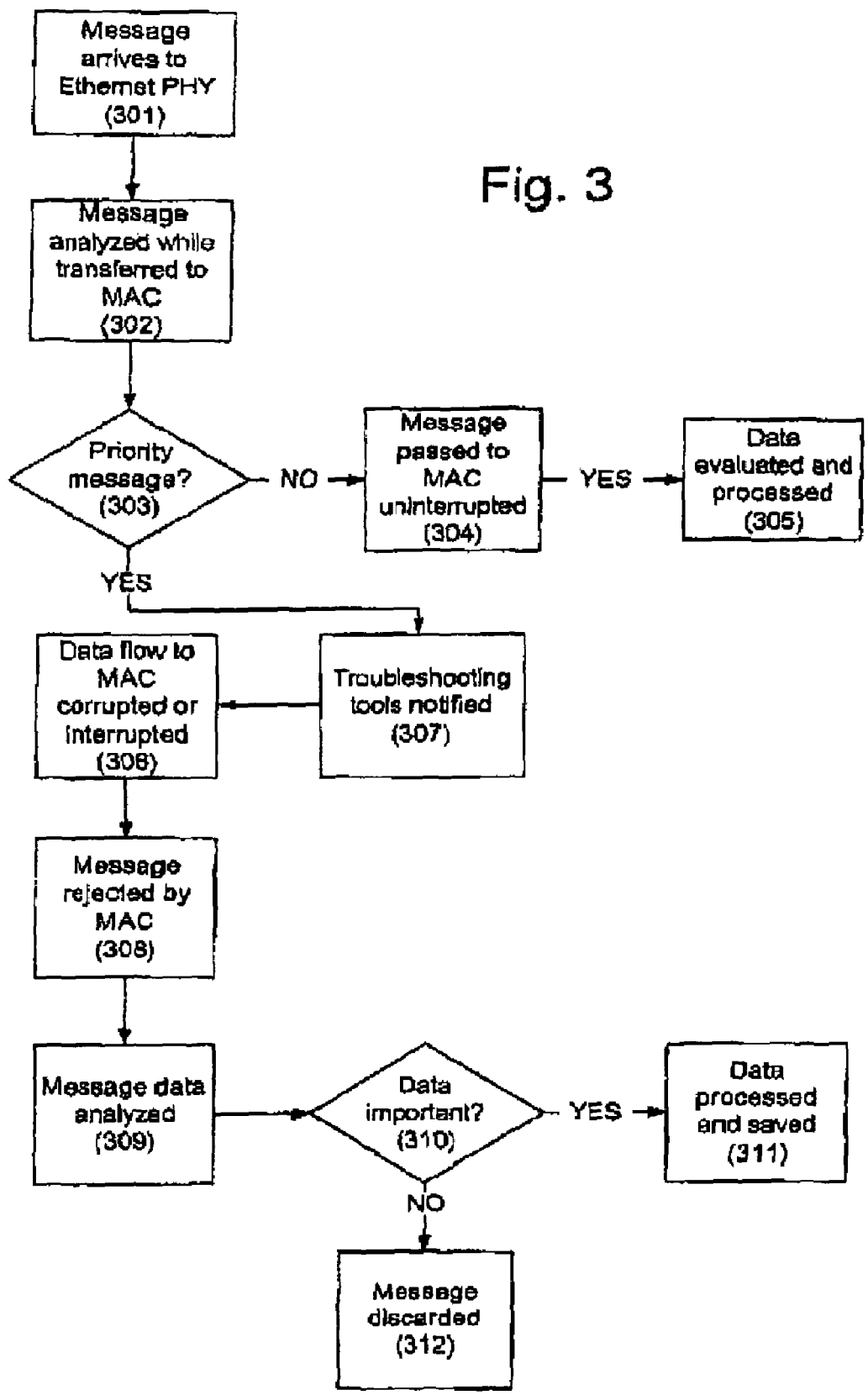
FIG. 3 is a block diagram illustrating a method of processing priority data in one aspect of the invention.

FIG. 3 is a flowchart illustrating a method of handling an Ethernet frame, or message, using a processing priority switch according to the invention. As shown in FIG. 3, the process begins when a message arrives to the Ethernet PHY layer (301) of a host device or "node" connected to the network. The message is then relayed from the Ethernet PHY to the MAC layer through components that analyze information in the header and payload of the message (302).

If the message is a priority message (303), real-time components of the invention corrupt or interrupt the data in transit (306), thereby forcing the MAC layer to reject the message (308). If the data content of the message is not of a high priority (303), the message is passed on to the MAC layer unaffected by the invention (304). The MAC layer then evaluates the data in the message using the Frame Check Sequence and, upon acceptance, processes the data through a protocol stack (305). In one aspect of the invention, troubleshooting tools can be notified and then used, if necessary, every time a priority message is recognized (307).

For the data in the messages that have a higher priority, the data packets are further analyzed (309) by real-time control components of the invention. If the data is considered important (310), the data is processed and stored in memory locations of the host device, e.g., computer, Programmable Logic Controller, I/O device, etc., corresponding to the data content (311). If the data is not important (310), the message is discarded (312).

Figure 4:
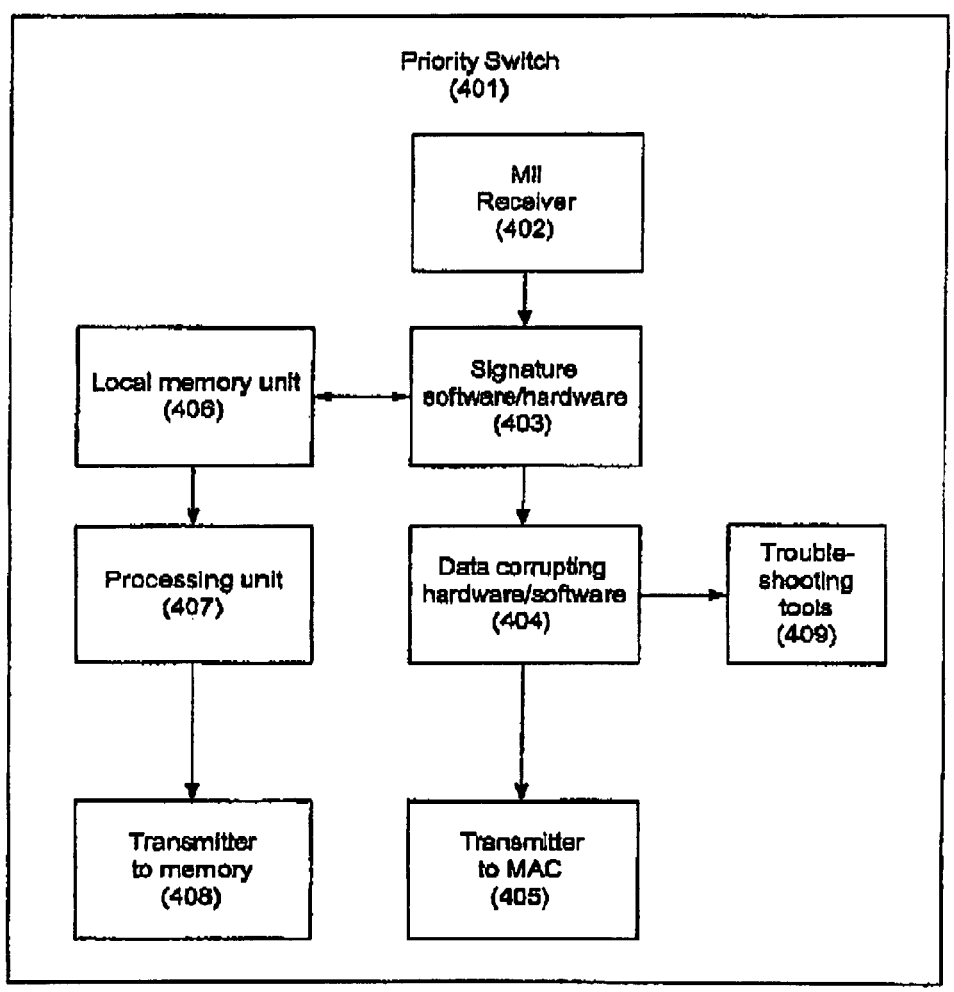
FIG. 4 is a block diagram illustrating a processing priority switch implementation in one aspect of the invention.

To carry out the process illustrated in FIG. 3, the invention uses any hardware or combination of hardware that carries out the described functions, such as an FPGA, ASIC, or Network processor. In one aspect of the invention, a processing priority switch is employed to carry out such functions. As shown in FIG. 4, the "processing priority switch" (401) includes a receiver (402), hardware and software for distinguishing message "signatures" (403), hardware and software for corrupting data (404), a transmitter to the MAC (405), a local memory unit (406), a processing unit (407), a transmitter to memory (408), and troubleshooting tools (409).

In one aspect of the invention the receiver (402) is an MII (Media Independent Interface) receiver, thus providing a standard communication interface between the Ethernet PHY and priority switch (401). As the digital signal from the PHY is received at the priority switch (401), hardware and embedded software (403), e.g., programmable memory, work together to compare the incoming message signature, i.e., information from the message header, payload, etc., to one or more priority message signatures stored locally. If the incoming message signature matches a priority message signature, hardware and software capable of corrupting, i.e., modifying, a data stream (404) are employed to corrupt the message as it passes through the processing priority switch (401) to the MAC through a transmitting medium (405). The priority message can also be stored temporarily in a local memory unit (406).

The data packets of priority messages are further analyzed by a processing unit (407) of the priority switch (401). If the data is of interest, the processing unit (407) extracts certain data from the packets and deposits the data in an appropriate memory location of the host device through a transmitting medium (408). The location of the memory in which the extracted data is deposited depends on the packet content. If the data content of a priority message is discovered to be of no interest, the message is discarded.

The troubleshooting tools (409) provide a means of inspection of the processing priority switch. In one aspect of the invention, the troubleshooting tools (409) consist of a counter, which increments every time a priority message is recognized. By inspecting the contents of the counter, a determination of a processing priority switch's functionality can be made.

In one aspect of the invention, the data content of interest consists of Ethernet Global Data (EGD) packets, and the hardware and embedded software used to analyze and handle incoming messages is built into an Application Specific Integrated Circuit (ASIC). Using the processing priority switch (401) allows faster processing for specific types of data at one or more nodes on a Local Area Network and reduces the traffic of messages traveling through the Ethernet MAC and subsequent protocol stack at each node that implements the processing priority switch.

Figure 5:
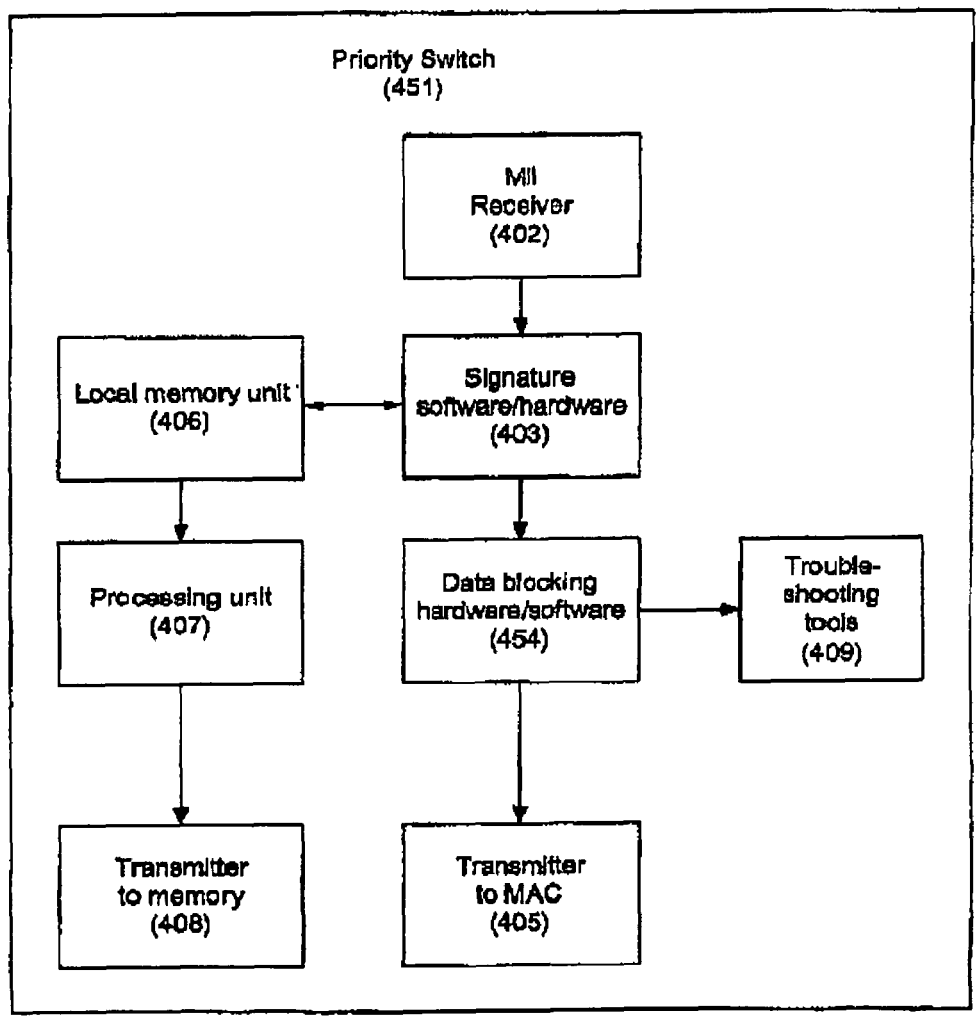
FIG. 5 is a block diagram illustrating another processing priority switch implementation in one aspect of the invention.

FIG. 5 illustrates another embodiment of the processing priority switch. As shown in FIG. 5, the processing priority switch (451) accomplishes the same function as the processing priority switch (401) of FIG. 4 and thus comprises similar hardware and software. One distinction is that a different algorithm (454) is used to block (instead of corrupt) priority messages from being processed by the Ethernet MAC layer. In other words, instead of corrupting the message as it flows to the Ethernet MAC, the processing priority switch (451) interrupts or blocks the flow of data to the Ethernet MAC. The hardware and software (454) for blocking the flow of data to the Ethernet MAC may allow additional improvements to the network processing speed.

The processing priority switch of the invention described above can be located in any location of the network that allows it to carry out the functions described above. One example of such locations includes data nodes, network switches, bridges, routers, and gateways.

Figure 6:
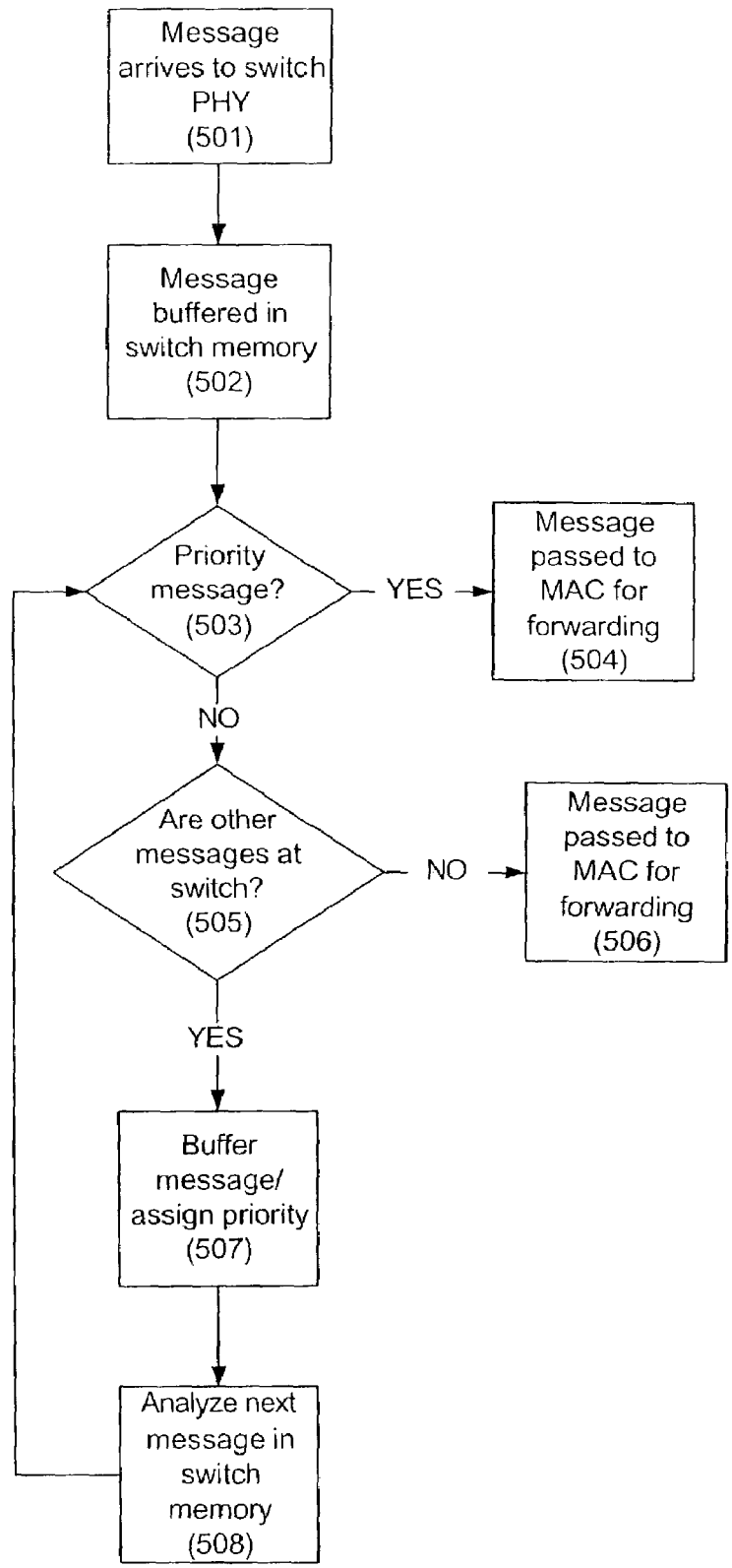
FIG. 6 is a flowchart illustrating a method of forwarding priority data in one aspect of the invention.

FIG. 6 is a flowchart illustrating a method of handling priority messages within the infrastructure of a network according to the invention. In particular, the method of FIG. 6 may be implemented at a switching device, routers, or gateways, in the network infrastructure. As shown in FIG. 6, a message arrives at a switch PHY layer (501) of a switching device. After the incoming message has been digitized by the PHY, it is stored, or "buffered" (502). By buffering the incoming messages, a switching device can receive and handle multiple messages.

If a message is a priority message (503), the message is passed on to a switch MAC layer for forwarding to a destination address (504). If a message is not considered high priority (503) and there are no other messages present at the switch device (505), the message is passed on to the switch MAC layer for forwarding (506). If a message is not high priority (503) and there are other messages present at the switching device (505), the non-priority message is buffered (507) and a waiting next message is analyzed (508). By repeating the method of FIG. 6, priority messages are forwarded with less delay caused by non-priority message traffic.

Figure 7:
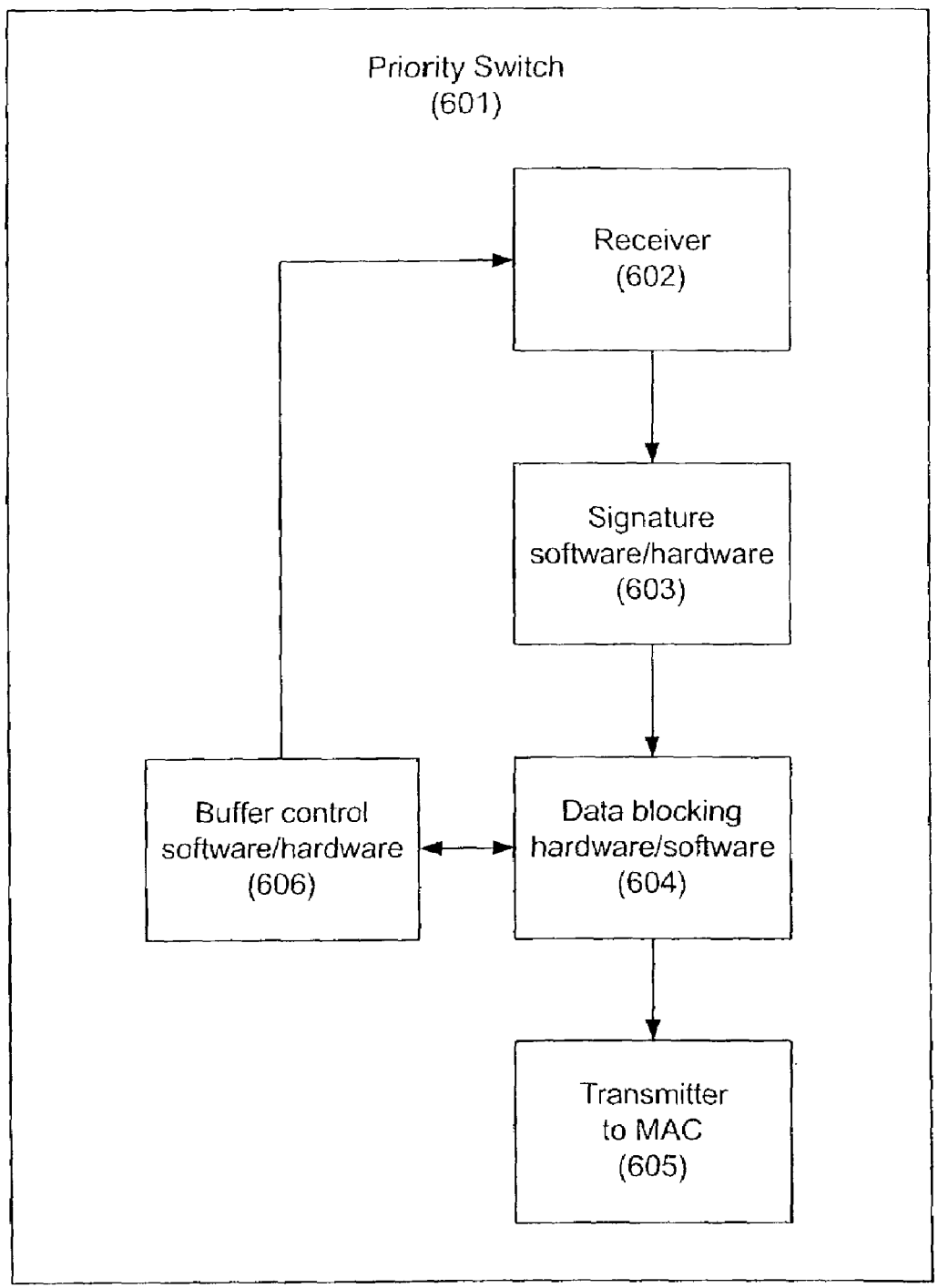
FIG. 7 is a block diagram illustrating a forwarding priority switch according to another aspect of the invention.

To carry out the process illustrated in FIG. 6, the invention uses any hardware or combination of hardware that carries out the described functions, such as FPGA, ASIC, Network processors, etc. In one aspect of the invention, a forwarding priority switch is employed to carry out such functions. As shown in FIG. 7, the forwarding priority switch (601) consists of a receiver (602), hardware and software for comparing incoming message signatures with a priority message signature (603), hardware and software for blocking data flow (604), a transmitter to Ethernet MAC (605), and hardware and software for buffer control (606).

In one aspect of the invention, multiple forwarding priority switches (601) are implemented in a multi-port switch. In this aspect, each port of the multi-port switch uses a separate forwarding priority switch (601). As a digital signal from the switch PHY or local memory is passed on through a receiver (602) to the forwarding priority switch (601), hardware and embedded software (603), e.g., programmable memory, work together to compare the incoming message signature, i.e., information from the destination address, source address, protocol type field, port number, data content, etc., to one or more priority message signatures stored locally. In a preferred aspect of the invention, a priority message will contain Ethernet Global Data (EGD) packets, and the receiver (602) will comprise an MII receiver.

If the incoming message signature matches a priority message signature, the message is forwarded to a MAC through a transmitting medium (605) and subsequently forwarded to an appropriate destination address. As multiple messages can be received by the multi-port switch on different ports simultaneously, the messages are buffered to allow each message to be processed, analyzed for priority, and forwarded in turn.

The buffer control hardware and software (606) allows the forwarding priority switch (601) to cycle through the buffered messages stored on the multi-port switch, forward priority messages, and ignore non-priority messages until no more priority messages are present on the multi-port switch. Additionally, the buffer control hardware and software (606) works with the blocking hardware and software (604) to interrupt a non-priority message in transit to allow an incoming priority message to be forwarded first.

The processing priority switch of FIGS. 4 and 5, and the forwarding switch of FIG. 7 can be used separately or in combination with each other to handle priority messages on a network. As a result, many network systems may be configured to benefit from the use of processing priority switches, forwarding priority switches, or a combination of both priority switches.

Figure 8:
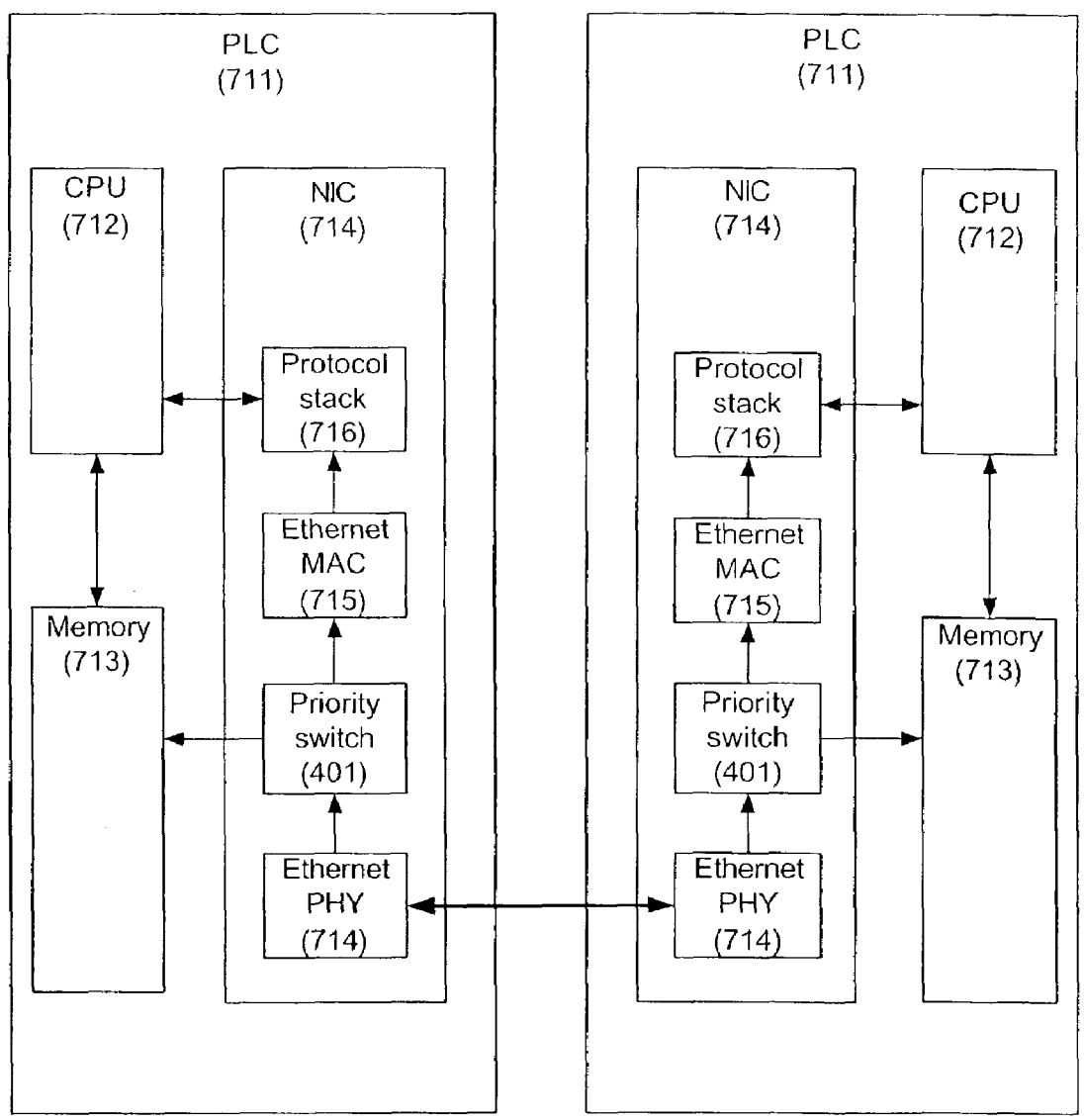
FIG. 8 is a block diagram illustrating a CPU to CPU implementation in one aspect of the invention.

In another aspect of the invention, the processing priority switches can be located on Network Interface Cards (NICs) that are attached to a host device, e.g., Programmable Logic Controllers (PLC), input/output (I/O) devices, routers, gateways, and the like. In one aspect of the invention, and as illustrated in FIG. 8, two NICs, each containing a processing priority switch, are implemented as part of two PLCs. As shown in FIG. 8, multiple Programmable Logic Controllers or PLC's (711) communicate with each other through the Network Interface Cards (714) which implement an Ethernet protocol. The PLC's (711) may be used in a variety of computer-controlled equipment, e.g., automated machinery, and provide processing resources needed by the automated equipment.

Each Network Interface Card or NIC (714) uses an Ethernet PHY (714), which converts an incoming analog signal to its digital counterpart. The digital signal is then passed through a processing priority switch (401) to the Ethernet MAC layer (715). As the message is being passed to the MAC (715), components of the processing priority switch (401) compare the incoming message signature, i.e., the destination address, the source address, the source and destination port, the data packet type, the protocol type, and the EGD (Ethernet Global Data) exchange identifier, to one or more message signatures stored locally on the processing priority switch (401). In one aspect of the invention, the processing priority switch (401) will target messages containing EGD packet types as priority messages.

If the message is a priority message, the processing priority switch (401) may corrupt the data as it flows to the Ethernet MAC layer (715) or, in another aspect, block the flow of data to the Ethernet MAC layer (715). In either aspect, the message is prevented from being accepted by MAC (715) for further processing through the protocol stack (716). Instead, the processing priority switch (401) further analyzes the content of the message. If the content is of interest, i.e., if the message contains certain EGD packets, the processing priority switch (401) extracts the data from the message and stores the data directly to memory (713).

In one aspect of the invention, the functionality of the priority switch can be verified by, e.g., a redundancy or logging check. In this aspect of the invention, the hardware and/or software for preventing processing by the MAC layer is temporarily disabled or turned off for a period of time to perform the redundancy or logging check.

If the message is not a priority message, the processing priority switch (401) transfers the data undisturbed to the MAC (715). The message will then be processed through normal means, i.e., using the protocol stack (716) in conjunction with the CPU (712) of the host device (in this case a PLC).

Figure 9:
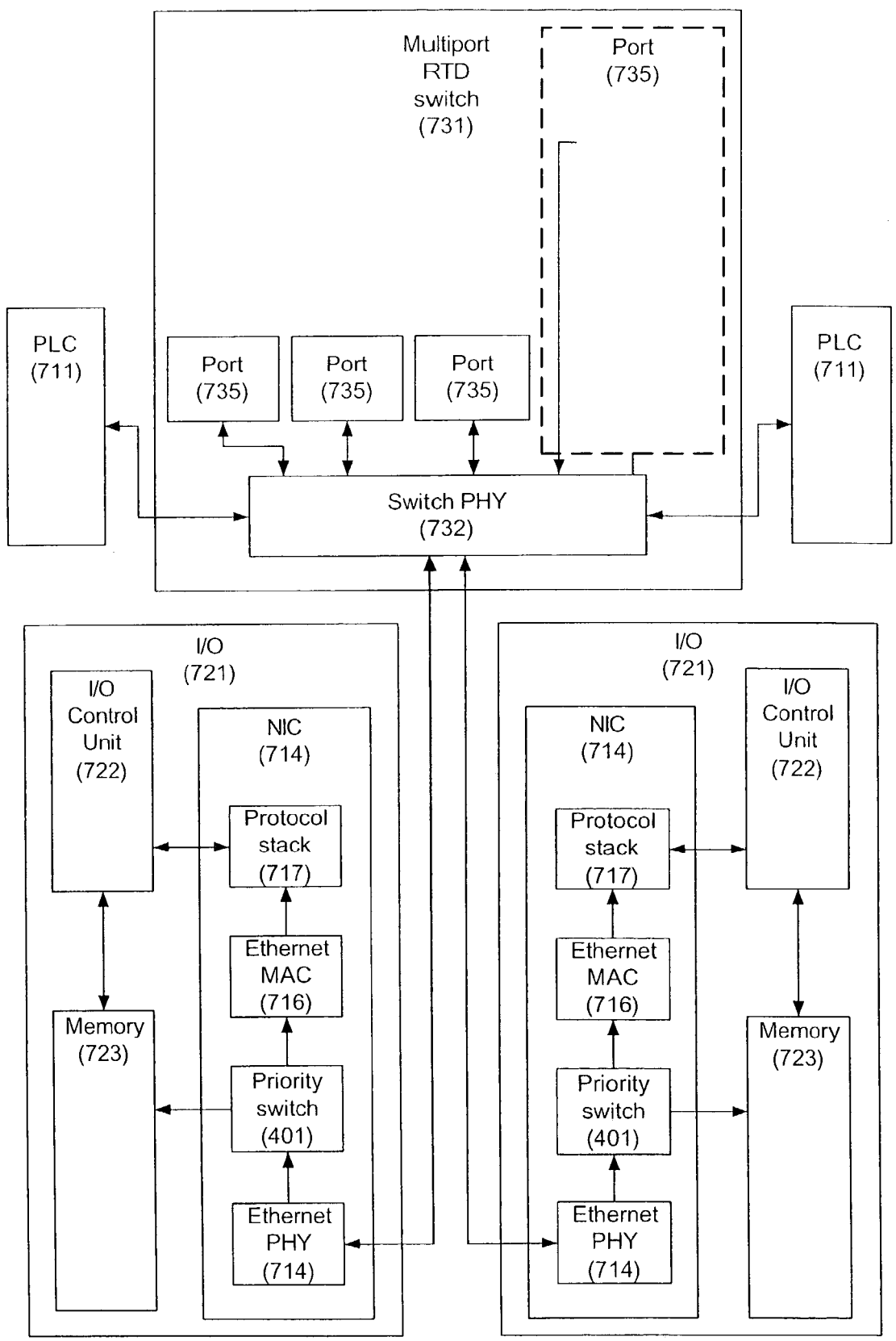
FIG. 9 is a block diagram illustrating a CPU to I/O device implementation in one aspect of the invention.

FIG. 9 illustrates a CPU to I/O implementation of the invention. As shown in FIG. 9, multiple PLC devices (711) and I/O devices (721), each containing a processing priority switch (401), are connected to each other through a multi-port RTD (Real-Time Data) switch (731), containing multiple forwarding priority switches (601). In general, each PLC (711) runs an algorithm for process control, and each I/O device (721) provides the interface to the physical devices in an automation environment using an I/O control unit (722) and a memory unit (723). Inputs are wired to devices such as, push buttons, limit switches, transducers, etc., and the outputs drive devices like relay coils, servos, etc. Together, PLC's (711) and I/O's (721) can form the control system for an automated machine.

The multi-port RTD switch (731) provides data traffic control for messages traveling on a network using a switch PHY (732), and multiple ports (735), each including a memory unit (734), a forwarding priority switch (601), and switch MAC (733). In particular, the RTD switch (731) is designed to give priority to messages containing EGD packets by comparing the priority of messages at all ports and forwarding those messages containing EDG packets first.

To accomplish this, the switch PHY (732) converts all incoming analog messages on the network to a digital signal that is subsequently stored, or buffered, in local memory. By buffering incoming messages, the multi-port RTD switch (731) can handle a finite amount of message at the same time.

The forwarding priority switch (601) compares the signature of an incoming or buffered message with signatures stored in local memory. If the data is non-EGD, i.e., non-priority, the message will only be forwarded when there are no other EGD-type messages in transit. The forwarding priority switch (601) also allows the RTD switch (731) to interrupt a non-EGD message being forwarded in favor of an incoming priority message. The interrupted message is forwarded again after all priority messages have been forwarded.

The switch MAC (733) ensures the integrity of the message in transit before sending the message back to the switch PHY (732) for forwarding to the intended I/O device (721) or PLC (711). The configuration of FIG. 9 prioritizes EGD-type messages in the Ethernet infrastructure, by implementing forwarding priority switches (601), and provides improved processing of EGD packets that arrive to the each I/O (721) and PLC (711), using processing priority switches (401). Additionally, traffic through the Ethernet MAC (716) and protocol stack (717) is decreased for each processing priority switch (401) equipped device connected to the network, allowing quicker processing for both priority and non-priority messages.

Figure 10:
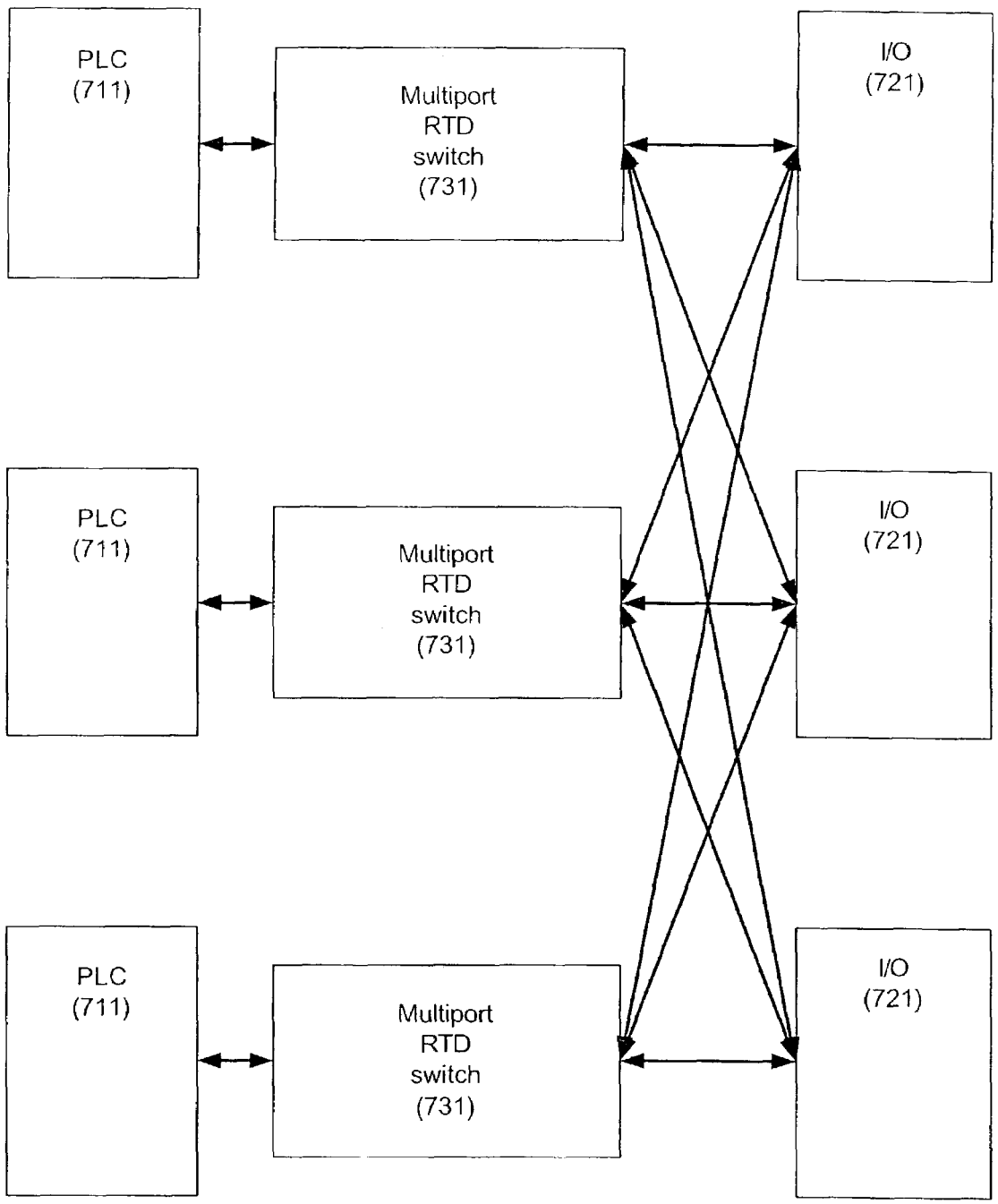
FIG. 10 is a block diagram illustrating a distributed processing CPU to I/O device implementation in one aspect of the invention.

FIG. 10 illustrates another CPU to I/O implementation of the invention. Unlike FIG. 9, FIG. 10 illustrates a distributed processing environment. In the distributed processing environment, each I/O device (721) is connected to two or more multi-port RTD switches (731) and subsequent PLC's (711). This implementation further increases the processing speed of the network by dividing the processing load across multiple PLC's (711) or other like processing units.

The preceding description has been presented only to illustrate and describe embodiments of invention. It is not intended to be exhaustive or to limit the invention to any precise form disclosed. Many modifications and variations are possible in light of the above teaching.

The foregoing embodiments of the invention were chosen and described in order to illustrate principles of the invention and some practical applications. The preceding description enables others skilled in the art to utilize the invention in various embodiments and with various modifications as are suited to the particular use contemplated. It is intended that the scope of the invention be defined by the following claims.

What is claimed is:

1. A method of prioritizing data transfer in a network, comprising:
   receiving and storing different types of data transmitted from an ethernet PHY layer in the network;
   distinguishing the priority of the different types of data transmitted from an ethernet PHY layer using priority data signatures to differentiate between higher priority data and lower priority data;
   intentionally corrupting higher priority data in transit to an ethernet MAC layer in the network to prevent the higher priority data from being processed via the ethernet MAC layer;
   forwarding the higher priority data to a destination address in the network without corrupting the higher priority data, such that the uncorrupted higher priority data is processed via a processing unit external to the ethernet MAC layer; and
   forwarding data of a lower priority to the ethernet MAC layer.

2. The method of claim 1, further comprising storing the lower priority data while the higher priority data is forwarded.

3. The method of claim 1, wherein said priority data signature comprises a destination address, a source address, a source and destination port, a data packet type, a protocol type, or an ethernet global data exchange identifier.

4. The method of claim 1, wherein said higher priority data contains a data packet type comprising ethernet global data packets.

5. The method of claim 1, wherein said priority data signature is located on the network between the ethernet PHY layer and an ethernet MAC layer.

6. The method of claim 1, wherein controlling the forwarding of data based on priority is performed using a forwarding priority switch.

7. The method of claim 6, wherein the forwarding priority switch is placed between the PHY layer and a MAC layer of a switching device.

8. The method of claim 2, further comprising separating the lower priority data into a first, higher priority and a second, lower priority.

9. The method of claim 8, further comprising forwarding the first, higher priority data and then forwarding the second, lower priority data.

10. The method of claim 8, further comprising separating the lower priority data using priority data signatures.

11. A method of prioritizing data in a network, comprising:
receiving incoming data from a network PHY layer, the network containing an ethernet protocol stack;
comparing a signature of the incoming data with a priority data signature to identify priority data;
intentionally corrupting the priority data to prevent the priority data from being processed in the ethernet protocol stack;
temporarily storing the priority data prior to being corrupted; and
processing the uncorrupted priority data using a simplified protocol stack designed to process a specific data packet type, wherein the simplified protocol stack is other than the ethernet protocol stack.

12. The method of claim 11, wherein said data packet type comprises ethernet global data packets.

13. The method of claim 11, wherein said priority data signature uses a destination address, a source address, a source and destination port, a data packet type, a protocol type, and an ethernet global data exchange identifier.

14. The method of claim 11, wherein receiving incoming data from a network PHY layer comprises receiving data from an ethernet PHY layer.

15. The method of claim 11, wherein said priority data signature is located on the network between the ethernet PHY layer and an ethernet MAC layer.

16. The method of claim 11, wherein preventing the priority data from being processed is performed using a processing priority switch.

17. The method of claim 16, wherein said processing priority switch is placed between the PHY layer and a MAC layer of a network interface card.

18. A device for prioritizing data within a network using an ethernet protocol stack, comprising:
means for comparing a signature of incoming data from an ethernet PHY layer with a stored priority data signature;
means for intentionally corrupting priority data corresponding to the stored priority data signature to prevent the priority data from being processed by the ethernet protocol stack;
means for temporarily storing uncorrupted priority data corresponding to the stored priority data signature; and
means for forwarding the uncorrupted priority data to a simplified protocol stack other than the ethernet protocol stack.

19. The device of claim 18, wherein said means for comparing a signature comprises hardware and software implemented on an application specific integrated circuit.

20. The device of claim 18, wherein said means for comparing a signature comprises hardware and software implemented using a field programmable gate array.

21. The device of claim 18, wherein said incoming data contains ethernet global data packets.

22. The device of claim 18, further comprising troubleshooting means containing a counter which increments whenever an incoming message matches the priority message signature.

23. A system containing one or more devices for prioritizing data within a network using an ethernet protocol stack, the devices comprising:
means for comparing a signature of incoming data from an ethernet PHY layer with a stored priority data signature to identify priority data and non-priority data;
means for controlling the forwarding of priority and non-priority data within the network's infrastructure;
means for intentionally corrupting the priority data to prevent the priority data from being processed by an ethernet protocol stack;
means for temporarily storing uncorrupted priority data; and
means for forwarding the uncorrupted priority data to a simplified protocol stack other than the ethernet protocol stack.

24. A system for prioritizing data in a network containing an ethernet protocol stack, the system comprising:
means for comparing a signature of incoming data from an ethernet PHY layer with a stored priority data signature;
means for intentionally corrupting priority data to prevent the priority data from being processed by the ethernet protocol stack;
means for temporarily storing uncorrupted priority data;
means for processing the data content in the uncorrupted priority data without accessing the ethernet protocol stack; and
means for transmitting said data content to a memory unit of a host device.

25. The system of claim 24, wherein the system is located in one or more locations between the ethernet PHY layer and an ethernet MAC layer of the network.

26. The system of claim 24, wherein said means for comparing a signature comprises hardware and software implemented on an application specific integrated circuit or field programmable gate array.

27. The system of claim 24, wherein said host device is a programmable logic controller.

28. The system of claim 24, wherein said host device is an input/output device.

29. A device for forwarding priority data within a network, comprising:
a medium for receiving incoming data from a switch PHY layer;
hardware and software for comparing the signature of said incoming data with a stored priority data signature;
hardware and software for preventing non-priority data from being processed until all priority data has been processed;
hardware and software for intentionally corrupting priority data to prevent the priority data from being processed by an ethernet MAC layer; and
a medium for transmitting both priority and non-priority data to a switch MAC layer wherein the uncorrupted priority data is processed via a simplified protocol stack within the switch MAC layer external to the ethernet MAC layer.

30. The device of claim 29, wherein the incoming data is received at a switch of the network.

31. The device of claim 29, wherein said device is implemented at each port of a switch.

32. A device for processing priority data in a network, comprising:
a medium for receiving incoming data from an ethernet PHY layer;
hardware and software for comparing the signature of said incoming data with a stored priority data signature;

hardware and software for intentionally corrupting priority data to prevent the priority data from being processed via an ethernet MAC layer;

a medium for transmitting both non-priority data and the corrupted priority data to the ethernet MAC layer;

a local memory unit for storing uncorrupted priority data;

a processing unit external to the ethernet MAC layer for extracting information from said uncorrupted priority data; and a medium for transmitting said extracted information to a memory location of a host device.

33. The device of claim 32, wherein the incoming data is received at a node of the network.

34. The device of claim 33, wherein the node comprises a programmable logic controller device.

35. The device of claim 33, wherein the node comprises an input/output device.

* * * * *